United States Patent [19]

Bosco et al.

[11] Patent Number: 4,753,334

[45] Date of Patent: Jun. 28, 1988

[54] AUTOMATIC DEVICE FOR GUIDING AND ORIENTING MAGNETIC TAPE CASSETTES

[75] Inventors: Angelo Bosco, Milanese; Edgardo Magnaghi, San Bovio, both of Italy

[73] Assignee: Robotecnica S.r.l., Sesto San Giovanni, Italy

[21] Appl. No.: 918,329

[22] Filed: Oct. 14, 1986

[30] Foreign Application Priority Data

Oct. 11, 1985 [IT] Italy ................. 22449 A/85

[51] Int. Cl.⁴ .................. B65G 47/24; B65G 43/08
[52] U.S. Cl. ..................................... 198/394; 198/395
[58] Field of Search ............... 198/394, 395, 400, 410

[56] References Cited

U.S. PATENT DOCUMENTS

| | | | |
|---|---|---|---|
| 3,554,352 | 1/1971 | Hillman | 198/394 X |
| 3,880,277 | 4/1975 | Tomelleri | 198/394 |
| 4,078,698 | 3/1978 | Bosco | 198/400 X |
| 4,271,955 | 6/1981 | Berube | 198/400 |
| 4,463,846 | 8/1984 | Ionescu | 198/400 X |
| 4,473,146 | 9/1984 | Oree, Jr. | 198/395 |
| 4,530,430 | 7/1985 | Peterlini | 198/395 |
| 4,545,476 | 10/1985 | Calvert | 198/394 X |
| 4,595,327 | 6/1986 | Woodley | 198/395 X |
| 4,624,360 | 11/1986 | Walk et al. | 198/395 X |
| 4,629,387 | 12/1986 | Stillman et al. | 198/394 X |

Primary Examiner—Kenneth J. Dorner
Assistant Examiner—José V. Chen
Attorney, Agent, or Firm—Barnes & Thornburg

[57] ABSTRACT

Automatic device for guiding and loading magnetic tape cassettes into a machine which loads tape onto the cassettes. The device includes an inlet funnel chute wherein a sensor determines the open side of the cassette. The cassette is then dropped onto a rotatable plate wherein sensors sense the location of the screws in the cassette and then the cassette is oriented for and passes to a second rotatable mechanism for righting the cassette. A logic unit evaluates the information from the two sensors and controls the rotatable plate and second rotatable mechanism to properly orient and righten the cassettes for the next station.

23 Claims, 4 Drawing Sheets

AUTOMATIC DEVICE FOR GUIDING AND ORIENTING MAGNETIC TAPE CASSETTES

BACKGROUND AND SUMMARY OF THE INVENTION

The subject of the present invention is an automatic device for guiding and orienting magnetic tape cassettes prior to the cassettes being positioned in a machine for the loading of the tape thereon.

Operational problem arises from the standards which require precise positioning of the metal screws which connect the two housing halves of which the cassette consists.

These standards provide that these screws must be in a certain position during the loading of the cassette. It is therefore necessary for the cassettes to be aligned precisely at the entrance of the machine used for loading cassettes with magnetic tape.

At the present time, the task of supplying the cassettes is handled by using a funnel which provides no special device for guiding and orienting the cassettes and leaves it up to the operator to align them correctly in advance.

This system results in considerable lost time. Human error probability during cassette guidance has proven to be too high.

Several cassette alignment devices are know, but they are limited to use upstream of the cassette conveyor belts and are composed of several independently operating stations. The disadvantage of these types of devices arise from their inability to supply groups of machines and also because, for cost reasons, they are not economically suitable for supplying an individual machine.

The principal goal of the present invention is to overcome the disadvantages of the prior art by providing a simple orienting mechanism which can feed cassettes to a plurality of machines and which can be mounted directly on a machine for loading cassettes with magnetic tape.

With these goals in mind, the invention comprises an automatic supply funnel for receiving randomly oriented cassettes and equipped with a first sensor means and an individual cassette escapement unloading device. A first guiding device is mounted at the bottom of the funnel and is equipped with a second sensor means. A pushing device conveys the individual cassettes from the first guiding device to a second guiding or aligning device. A logic control unit, which also serves for control, is provided, capable of monitoring and controlling the guidance of the cassette at each guiding device in response to the input from the sensors and to affect appropriate orientation at each guiding device and to coordinate the escapement from the funnel and the pushing of the cassettes between the guiding device.

In a preferred embodiment of the present invention, said means for guidance and rotation can be motorized or connected by means of gearing with a geared motor. The first sensor is located in the funnel to determine on which side of the funnel the open side of the cassette is and then controls the second rotation guiding device at the delayed time when the cassette reaches that second guiding device. The second sensors sense the position of the screws in the cassette, after its drop from the funnel by means of the escapement mechanism to the first guiding device, to orient the cassette for passage to the second guiding device. A pusher mechanism is provided to move the cassette between the first and second guiding devices, while the second guiding device places the cassette on a conveyor mechanism after orienting the position of the open end of the cassette with respect to the conveyor after which the cassette is released to the conveyor.

These and other objects, features, and advantages of the present invention will become more apparent from the following description when taken in connection with the accompanying drawings which show, for purposes of illustration only, a single embodiment in accordance with the present invention and wherein:

DETAILED DESCRIPTION OF THE DRAWINGS

Figure 1:
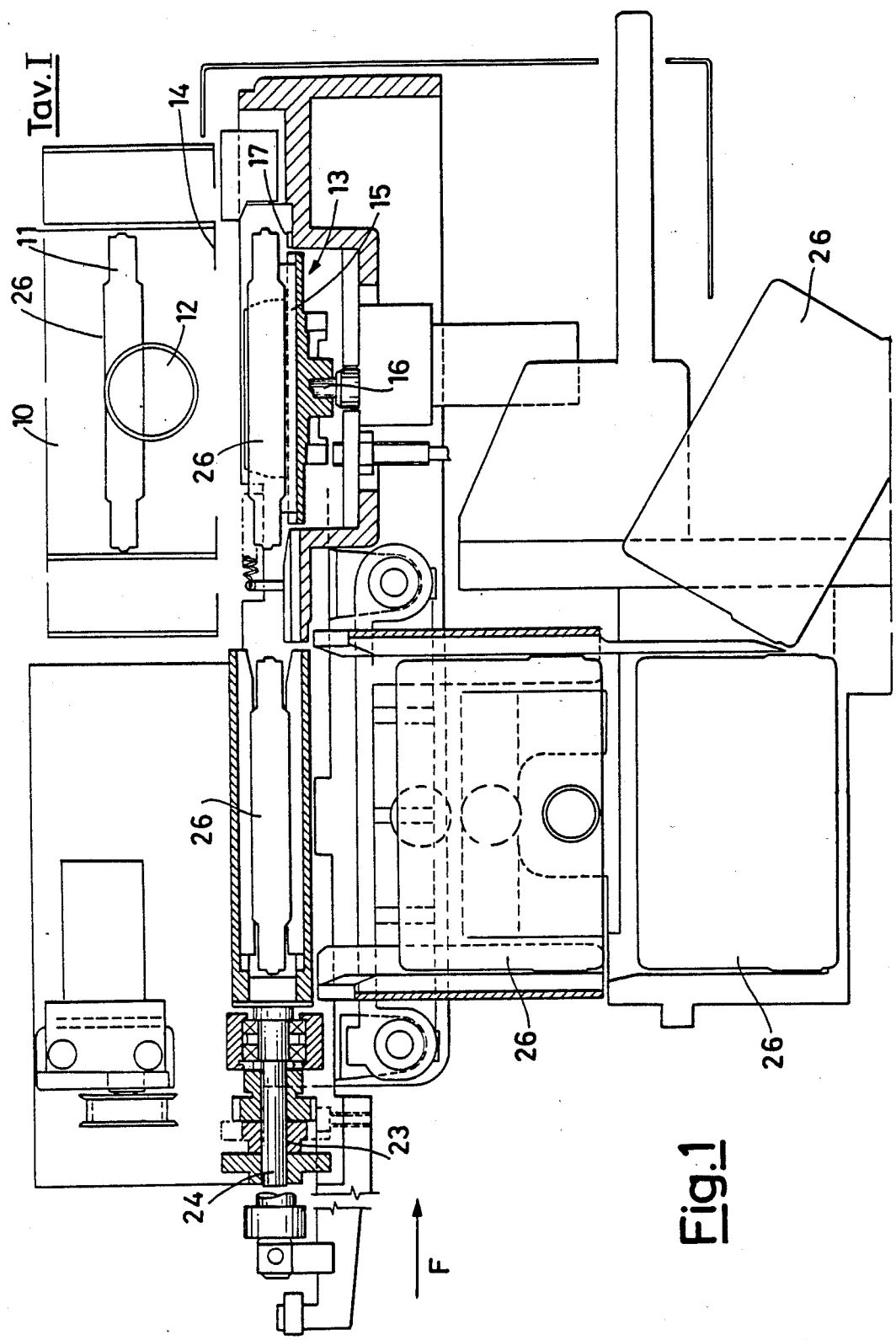
FIG. 1 is a side view, partially in cross section, of the device according to the invention.
Figure 2:
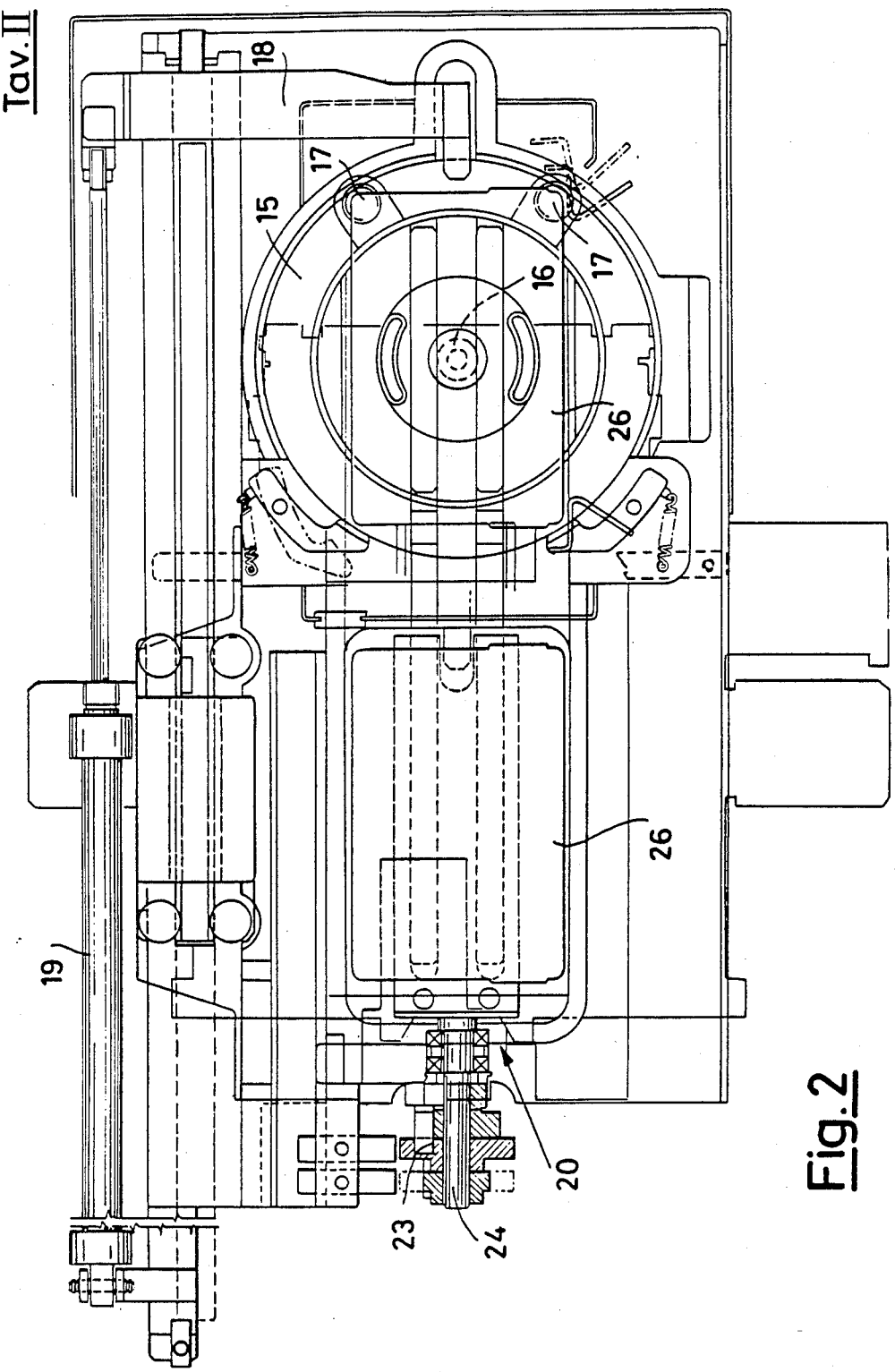
FIG. 2 is a plan view of the elements in FIG. 1.
Figure 3:
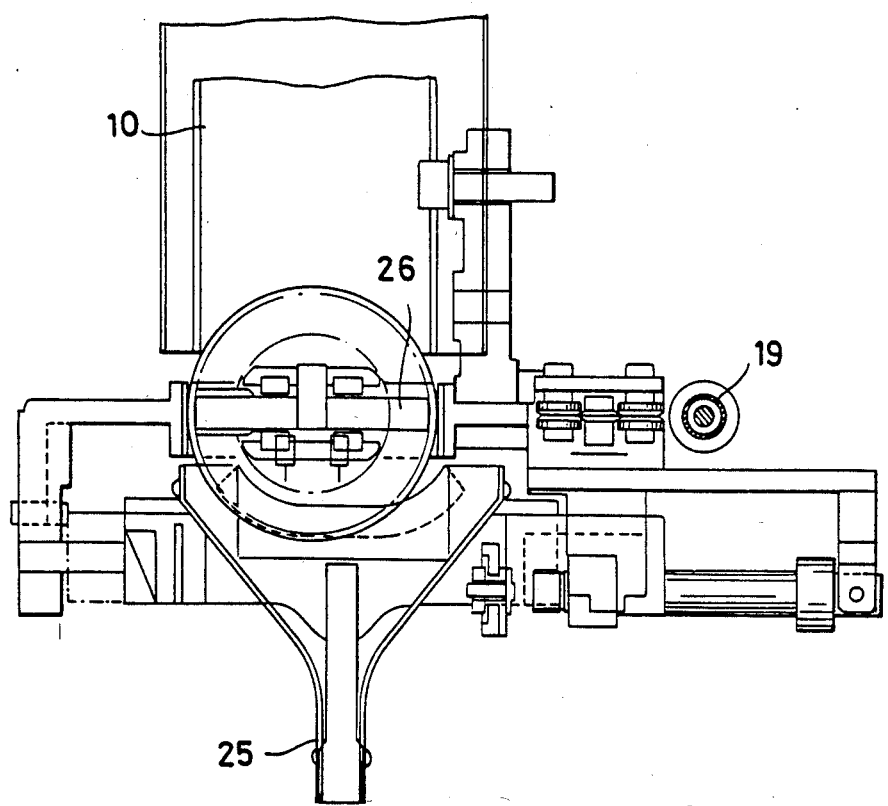
FIG. 3 is a view looking in the direction of arrow F in FIG. 1.
Figure 4:
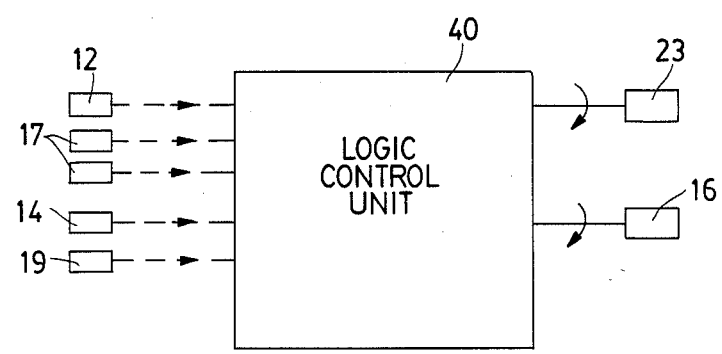
FIG. 4 is a schematic showing of the control circuit logic.

Referring now to the drawings wherein like reference numerals are used to designate like parts and more particularly to FIG. 1, a funnel 10 is provided for feeding cassettes 11 to a cassette orientation mechanism. A proximity sensor 12 is located to sense the location of the open side of the cassette as it passes through funnel 10. During its downward travel, the cassette, after passing sensor 12, is brought to a first guiding device 13 by means of an isolating escapement mechanism 14. The isolating mechanism is of any standard escapement device which cyclically permits passage of but one cassette from the end of the funnel 10, as is well known in the conveyor art. First guiding device 13 consists of a rotatable plate 15 coupled to a transmission device 16 which can rotate the plate 17 to orient the cassette to be received by U-shaped guiding member 21 at the next station. Two sensors 17 are located adjacent rotatable plate 15 to detect the presence and position of screws on the outside of a cassette 11 in contact with plate 15. The sensors operate a control mechanism to drive the transmission drive 16 and thus rotate plate 15 such that the long side of cassette 10 is directly in line with the long side of the U-shaped member 21.

In addition, a pushing device 18 is provided, adjacent to the plate and coplanar with said cassette, said device 18 being moved by a pneumatic cylinder 19. Pushing device 18 serves to slide cassette 11 horizontally after it has been properly oriented past spring loaded pivoted guiding levers 30 toward the second guiding devices 20 which consists of a U-shaped section 21 having internal projections 22 and connected with a power transmission shaft 23 at the base of the U-shaped element 21. U-shaped element 21 is rotatable about its axis 24 to rotate and bring the cassette onto a carriage 25 which conveys it to be processed further. The U-shaped element rotates the cassette 90°, or 90° plus 180°, to position the open end of the cassette with respect to carriage 25 in response to a signal from sensor 12 which indicates where the open side of the cassette is.

During normal operating cycles of machine the for loading cassettes with magnetic tape, the cassettes are supplied purely at random, and are then passed through a device like that described in the present invention for proper alligning of the cassettes at the next work station.

OPERATION

The cassette shown schematically at 11 travels in funnel 10 until it passes in front of sensor 12 which serves to determine on which side of cassette 11 an opening in the cassette is located. In succession the cassettes traveling down funnel 10 are unloaded one after the other by means of isolating escapement mechanism 14 which permits only one cassette to be placed on the rotating plate.

Once a cassette arrives on rotating plate 15 of guiding device 13, sensors 17 serve to detect the presence of screws on the surface of cassette 11 which is in contact with plate 15.

The latter information, together with that from sensor 12, is read and processed by a logic unit 40 for monitoring and control, which unit is connected both with sensor 12 and with sensors 17.

When the logic unit has precisely determined the position of the cassette as a function of the information received by the sensors and as a function of the ability of plate 15 and element 21 to move, it gives transmission shafts 16 and 23 the command to rotate. In some positions of a cassette 11 as it lands on plate 15, the plate can remain immovable. U-shaped element 21 normally rotates in only one direction. In this regard, when the machine is first operated, only the escapement 14 is operated; next the table 15 will rotate and then only to the extent necessary to align the cassette with the U-shaped element 21 as determined by sensors 17; next the cylinder 19 will be actuated to cause pushing device 18 to move the cassette to the left through the pivoted guider 30, as shown in FIG. 1 wherein the projections 22 of the U-shaped lever 21 grasp the wide portion 26 of the cassette 11; the cylinder 19 is then retracted to its original position; next a new cassette is dropped onto the rotating plate 15; at this point the disk is again rotated by the sensors as before while the U-shaped element 21 is also rotated around axis 24 for 90°, or 90° plus 180°, to orient the cassettes with their open end either facing the conveyor 25 as is necessary or facing away from the conveyor 25 and then the U-shaped member permits release of the cassette to the conveyor. The particular release can be effected by any conventional method such as by opening of the U-shaped element 21 or by having openings in the side of the U-shaped member to permit the cassettes to fall by gravity to the conveyor after the U-shaped element has come to rest. Thus it can be seen that there is a delay between sensor 12 sensing the location of the open side of the cassette and the time it instructs shaft 23 on how far to rotate. The conveyor 25 feeds the correctly aligned cassette to a machine whereon tape is wound on the cassette.

The particular details of the control system are not disclosed herein as such would be obvious to one skilled in the art. Suffice it to say that the control could be a minicomputer with appropriate delay circuits and actuating outputs so that the signals from sensors 12 and 17 can be stored and used to rotate the approve drive shafts 23 and 26 at the right time and in sequence with the proper operation of the escapement mechanism 14 and pusher cylinder 19 to control and monitor the alignment of the cassettes at each guiding device.

While we have shown and described only one embodiment in accordance with the present invention, it is understood that the same is not limited therto but is susceptible to numerous changes and modifications as known to one having ordinary skill in the art, and we therefore do not wish to be limited to the details shown and described herein, but intend to cover all such modifications as are encompassed by the scope of the appended claims.

What is claimed:

1. Automatic device for guiding and orientating magnetic tape cassettes, comprising a feed funnel into which the cassettes are randomly oriented, said funnel containing first sensor means to monitor the alignment of a cassette in the feed funnel and an exit escape mechanism to singly allow a cassette to leave the funnel and drop on a first guiding device provided below the funnel, second sensor means are provided adjacent said first guiding device to monitor the alignment of a cassette outside of the feed funnel, a second guiding device, means to move said cassettes from the first guiding device to said second guiding device, a logic unit means for controlling and monitoring the alignment of said cassettes at each guiding means connected with the first and second sensors monitoring the alignment as well as with the first and second guiding devices for controlling the alignment wherein the logic unit in response to the first sensor means adjusts one of the first and second guiding devices in response to the monitored alignment of the cassette in the feed funnel and adjusts the other of said first and second guiding devices in response to the second sensor means as concerns the monitored alignment of the cassette outside the feed funnel.

2. A guiding device according to claim 1, wherein said first and said second sensors consist of proximity sensors which detect the presence of metal.

3. A guiding device according to claim 2, wherein the means to move the cassette between said first guiding devices and said second guidance device is a pushing device.

4. A guiding device according to claim 3, wherein said pushing device is a pneumatic cylinder.

5. A guiding device according to claim 3, wherein said second guiding device consists of a U-shaped element which has projections on the inside and is connected with a transmission shaft.

6. A guiding device according to claim 2, wherein said first guiding device consists of a rotatatable plate connected to a transmission shaft.

7. A guiding device according to claim 6, wherein said second guiding device consists of a U-shaped element which has projections on the inside and is connected with a transmission shaft.

8. A guiding device according to claim 6, wherein the means to move the cassette between said first guiding devices and said second guidance device is a pushing device.

9. A guiding device according to claim 8, wherein said pushing device is moved by a pneumatic cylinder.

10. A guiding device according to claim 8, wherein said second guiding device consists of a U-shaped element which has projections on the inside and is connected with a transmission shaft.

11. A guiding device according to claim 2, wherein said second guiding device consists of a U-shaped element which has projections on the inside and is connected with a transmission shaft.

12. A guiding device according to claim 1, wherein said first guiding device consists of a rotatable plate connected to a transmission shaft.

13. A guiding device according to claim 12, wherein the means to move the cassette between said first guiding devices and said second guidance device is a pushing device.

14. A guiding device according to claim 13, wherein said pushing device is moved by a pneumatic cylinder.

15. A guiding device according to claim 13, wherein said second guiding device consists of a U-shaped element which has projections on the inside and is connected with a transmission shaft.

16. A guiding device according to claim 12, wherein said second guiding device consists of a U-shaped element which has projections on the inside and is connected with a transmission shaft.

17. A guiding device according to claim 1, wherein the means to move the cassette between said first guiding devices and said second guidance device is a pushing device.

18. A guiding device according to claim 17, wherein said pushing device is moved by a pneumatic cylinder.

19. A guiding device according to claim 17, wherein said second guiding device consists of a U-shaped element which has projections on the inside and is connected with a transmission shaft.

20. A guiding device according to claim 1, wherein said second guiding device consists of a U-shaped element which has projections on the inside and is connected with a transmission shaft.

21. A guiding device according to claim 1, wherein the first sensor determines the position of an open area of a cassette and provides to the logic unit means a control input for the second guiding device to orient the location of the open side.

22. A guiding device according to claim 21, wherein the second sensors determine a proper orientation for feeding the cassette to the second guiding device by sensing the position of screws on the cassette and provide to the logic unit means a control input for the first guidance device.

23. A guiding device according to claim 1, wherein the second sensors determine a proper orientation for feeding the cassette to the second guiding device by sensing the position of screws on the cassette and provide to the logic unit means a control input for the first guidance device.

* * * * *